2,969,380
Patented Jan. 24, 1961

2,969,380

ACID PRODUCTION

Charles M. Selwitz, Monroeville, Pa., assignor to Gulf Research & Development Company, Pittsburgh, Pa., a corporation of Delaware No Drawing. Filed Nov. 5, 1957, Ser. No. 694,511

7 Claims. (Cl. 260—413)

This invention relates to oxidation processes and more particularly to oxidation processes for converting hydrocarbons to monocarboxylic acids.

I have found that monocarboxylic acids of high purity can be produced in good yield by a process which comprises oxidizing a substantially pure hydrocarbon with a gas containing molecular oxygen in the presence of an inorganic or low molecular weight aliphatic or aromatic organic acid for a time sufficent to obtain a product comprising monohydroxy secondary alcohols, lesser amounts of ketones, more complex oxidation products such as esters, acids, hydroxy acids, hydroxy esters, keto esters, keto acids, anhydrides, etc., and unreacted hydrocarbon, carefully separating the alcohols and ketones from such product, and thereafter oxidizing the alcohols and ketones with nitric acid to obtain the corresponding monocarboxylic acids. More particularly, the product resulting from oxidation with molecular oxygen is saponified with a base to convert the esters into the corresponding acid salts and alcohols, the alcohols are recovered from the resulting product, and the alcohols so recovered are thereafter oxidized with nitric acid to obtain the corresponding monocarboxylic acids. Still more particularly, the product resulting from the initial oxidation with the gas containing molecular oxygen is extracted with a base prior to saponification to remove the free acids therefrom. Preferably the extract obtained is treated with a water immiscible organic liquid to recover esters, alcohols and/or unreacted hydrocarbons, which may have been removed with the extract, and the same recombined with the material remaining from the acid extraction.

The monocarboxylic acids produced in accordance with the present invention have wide applicability but are preferably employed in the formulation of paint dryers and catalyst salts, and for pharmaceutical preparations.

As charge for the process of this invention any saturated straight or branch chain hydrocarbon can be employed. In general, the hydrocarbon should have 6 to 40 carbon atoms in the molecule, preferably 16 to 26 carbon atoms. Examples of hydrocarbons which can be used are hexadecane, tetracosane, 5-methylundecane, 8,11-diethyloctadecane, 4-methylundecane, 3,4-dimethylhexadecane, 5-ethyleicosane, etc.

The oxidation of the hydrocarbon charge with molecular oxygen can be carried out effectively in any convenient reactor, but preferably is effected in a vessel equipped with two condensers, the first, operating at a temperature of about 30° to 60° C., to keep heavier products in the vessel, and the second, operating at a temperature of about —70° to 30° C. to remove undesired condensible materials. The oxidation is preferably carried out at atmospheric pressure, although higher pressures can be used if desired. While raising the pressure can speed the reacton somewhat, it will inhibit the removal of the lighter oxidation products, which inhibit the oxidation reaction, from the reactor. For such reason the pressure is generally maintained below about 5 atmospheres. In general the temperature of the first stage reaction should be above the melting point of the charge. The temperature should therefore be about 100° to about 180° C., preferably about 140° to about 160° C.

Any gas containing molecular oxygen, such as oxygen itself or air, can be employed in the first stage reaction. While any method which provides for physical contact between the hydrocarbon charge and the gas containing molecular oxygen can be used in the first stage oxidation, I prefer to stir the hydrocarbon charge while blowing the gas therethrough. The amount of molecular oxygen which must be used during the reaction lies between about one and 20, preferably between about 2 and 5, cubic feet per hour per pound of hydrocarbon charge. Slower rates would prolong the oxidation reaction, although side reactions resulting in greater amounts of degradation products would still continue. Higher rates would tend to blow the contents of the reactor out of the reactor. The reaction with molecular oxygen is continued until about 10 to about 40 percent by weight of the hydrocarbon charge is converted to oxidation products. If less than about 10 percent of the hydrocarbon charge is converted, the process would not be economically attractive, while conversions higher than about 40 percent lead to excessive secondary reactions and lower alcohol efficiencies. An oxidation period of about 3 to about 10 hours is sufficient to effect such results.

In order to inhibit oxidation of the alcohol to secondary oxidation products, it is absolutely necessary to carry out the reaction in the presence of about 2 to about 20, preferably about 5 to about 10, percent by weight, based on the hydrocarbon charge, of an inorganic acid or a low molecular weight aliphatic or aromatic organic acid. Examples of such acids are boric acid, acetic acid, benzoic acid, phosphoric acid, formic acid, propionic acid, maleic acid, etc. Best results are obtained using boric acid. Oxidation catalysts, such as manganese stearates, sodium oxalate and vanadium pentoxide, in an amount corresponding to about 0.3 to about 2 percent by weight, based on the hydrocarbon charge, can be employed if desired, although the reaction can be carried out in the absence of such catalyst to give lower yields but higher selectivity of alcohols.

The product resulting from oxidation of the hydrocarbon charge with molecular oxygen contains about 4 to about 15 percent by weight of monohydroxy secondary alcohols and about one to about 5 percent by weight of ketones. Examples of such alcohols and ketones are 2-hexadecanol, 2-tetracosanol, 6-methyl-2-undecanol, 8,11-diethyl-2-octadecanol, methyl tetradecyl ketone, methyl docosyl ketone, methyl 4-methylnonyl ketone, methyl 6,9-diethyl-2-hexadecyl ketone. Such alcohols and ketones are desirable, for in the second stage of the present process they are converted by reaction with nitric acid to the corresponding monocarboxylic acids. Unfortunately the product resulting from oxidation of the hydrocarbon charge with molecular oxygen additionally contains about 10 to about 60 percent by weight of more complex oxidation products which are believed to be esters, acids, hydroxy acids, hydroxy esters, keto esters, keto acids, acid anhydrides, etc., unreacted hydrocarbons, the inorganic or low molecular weight aliphatic or aromatic acid and, when used, an oxidation catalyst. Such materials with nitric acid produce many undesirable decomposition and degradation products. Therefore, it is absolutely necessary to remove such materials from the oxidation product prior to oxidation of the alcohols and ketones obtained with nitric acid.

In order to remove the alcohols and ketones from the oxidation product described above, the oxidation product is saponified with about one to about 20 percent by weight of a base, such as aqueous sodium hydroxide, aqueous potassium hydroxide, ethanolic potassium hydroxide, soda lime, etc. at a temperature of about 10° to about 100° C. and a pressure of about 10 to about 100 pounds per square inch. As a result of such action the esters present are converted to the corresponding acid salts and to the corresponding monohydroxy alcohol. In the event an aqueous base has been used, an upper hydrocarbon layer and a lower aqueous layer will result. If a non-aqueous base, such as an ethanolic solution of sodium hydroxide, is employed, water can be added to the saponification mixture, and an upper hydrocarbon layer and a lower aqueous layer will result. In either event, the aqueous layer will contain the acid salts. The hydrocarbon layer will contain the remaining materials and is removed from the lower aqueous layer by any suitable means, such as by decantation or by use of a separatory funnel.

Remaining in the hydrocarbon layer along with the monohydroxy secondary alcohols and ketones are the unreacted hydrocarbons. Prior to oxidizing the alcohols and ketones, the unreacted hydrocarbons must be removed from admixture therewith. This can be effected by distilling the product at a temperature of about 50° to about 300° C., and a pressure of about 0.1 mm. to about 760 mm. of Hg. The unreacted hydrocarbons are removed first, followed by the alcohols and ketones. The separation can also be effected by chromatography. Thus the product can be passed onto a column, which can vary from a length of about 5 to about 50 inches and a diameter of about ½ to about 6 inches, packed with a porous particulate material, such as alumina, silica, calcium carbonate etc., having an average particle size of about 20 to about 80 mesh at a temperature of about 20° to about 40° C. and a pressure of about 15 to about 100 pounds per square inch. A non-polar, low-boiling eluting agent, such as pentane, hexane, heptane, benzene, petroleum ether, etc. is passed through the column to force the unreacted hydrocarbon charge therethrough. The unreacted hydrocarbon, first to pass through the column, can be discarded or recycled to the first stage of the process. Next, a low-boiling polar eluting agent such as methanol, ethanol, acetone, formal, methylethyl ketone, etc. is passed through the column to force the oxidized charge therethrough, and the desired alcohol and ketone is obtained after removal of the polar eluting agent. In general, the first 75 percent by weight of the material passing through the column is unreacted hydrocarbon, while the next 20 percent by weight is made up of desirable alcohol and ketone. Other methods applicable to separation of such mixtures which can be used include urea adduct formation, solvent extraction, thermal diffusion, fractional crystallization, borate ester extraction, etc.

In order to effect an even cleaner separation of desirable alcohols and ketones from the oxidation product resulting from oxidation with a gas containing molecular oxygen, such product before saponification is preferably extracted with a base, such as aqueous sodium hydroxide, aqueous potassium hydroxide, ethanolic sodium hydroxide, etc., in an amount corresponding to about 0.3 to about 10 percent by weight, at a temperature of about 10° to about 40° C. and a pressure of about 15 to about 45 pounds per square inch. Two layers will result from such action, an upper hydrocarbon layer and a lower extract layer containing a substantial amount of the acid salts. The hydrocarbon layer is removed from the extract layer by any suitable means, for example, decantation or by use of a separatory funnel, and is thereafter subjected to saponification conditions hereinbefore described.

An even greater recovery is obtained by treating the extract layer described above with about 20 to about 400 percent by weight of a water immiscible organic liquid, such as petroleum ether, diethyl ether, hexane, butane, etc., at a temperature of about 5° to about 45° C. and a pressure of about 15 to about 45 pounds per square inch. The organic liquid described removes from the extract layer solid neutral organic materials, such as esters, alcohols and unreacted hydrocarbon which may have been removed by the extract. Two layers, an upper petroleum ether layer, for example, and a lower extract (base) layer result from such treatment. The layers are again separated by any convenient means, as before, and the immiscible organic liquid removed, for example, by evaporation, leaving behind the neutral organic materials. The latter materials can then be combined with upper hydrocarbon layer removed in the extraction phase with the base and the total mixture saponified as described.

The substantially pure mixture of monohydroxy secondary alcohols and ketones are thereafter subjected to oxidation with nitric acid to obtain the corresponding monocarboxylic acids. The nitric acid used can have a concentration of about 20 to about 70, preferably about 40 to about 60. A temperature of about 50° to about 70° C. and a pressure of about 15 to about 45 pounds per square inch is satisfactory. In order to assure a substantial conversion of alcohols and ketones to the corresponding acids, a reaction time of about one to about 5 hours is necessary. The amount of nitric acid required relative to the charge on a weight basis can be varied over a wide basis and should be at least about 1:1 molar and preferably about 5:1 to about 10:1 molar. In order to speed up the reaction and conserve nitric acid, a gas containing molecular oxygen in an amount corresponding to about 2 to about 5 cubic feet per hour per pound of charge can be used. Examples of monocarboxylic acids which are obtained in accordance with the process of this invention are myristic, stearic, undecanoic, 4-methylnonanoic, etc.

The monocarboxylic acids produced can be separated from the nitric acid reaction product in any convenient manner. If the monocarboxylic acid is a solid, the nitric acid is cooled to a suitable low temperature, for example, about 0° to about 10° C., and the acid removed by filtration. If the acid is liquid, it is removed from the reaction product by extraction with about 20 to about 200 parts by weight of a hydrocarbon solvent inert to the nitric acid, such as hexane, butane, petroleum ether, cyclohexane, isooctane, etc. The solvent can then be removed by distillation, leaving behind the desired monocarboxylic acid.

The process of this invention can be further illustrated by reference to Example I below.

*Example I*

Over a period of 5 hours and 15 minutes, 10.8 cubic feet per hour of dry air was passed through a mixture containing 679.3 grams of cetane, 75.5 grams of boric acid and 10 cc. of manganese naphthenate (0.57 gram as elemental manganese) at a temperature of 160±3° C. and a pressure of 14.7 pounds per square inch to obtain 681.4 grams of oxidation product. 647.8 grams of the oxidation product obtained was dissolved in 1500 milliliters of absolute ethanol, to which was added 10 milliliters of 40 percent aqueous sodium hydroxide. The resulting mixture was poured into 1500 milliliters of distilled water at 70° C. to form two layers, an upper hydrocarbon layer containing 479 grams of material, and a lower caustic layer. The lower caustic layer was extracted with eight 250 milliliter portions of petroleum ether having a boiling point of 40° to 60° C. These extracts, after removal of petroleum ether therefrom by evaporation, were added to the portion originally insoluble in the sodium hydroxide to give a total of 492 grams of non-acidic product, since the acid material was extracted by the soduim hydroxide. The caustic, or sodium hydroxide solution, was acidified with excess hydrochloric acid to yield 167.7 grams of precipitated acids which separated as an oil phase. The remaining aqueous phase was then extracted four times with 300 milliliters of petroleum ether to give 32 grams more of acid.

Esters were removed from the non-acidic fraction described above by saponification which involved refluxing such fraction for 6 hours in one liter of a solution made by mixing 260 grams of potassium hydroxide, one liter of water and 4 liters of methanol. After this treatment 133 grams of unsaponifiable material remained, which was then chromatographed in a column of alumina (having an average particle size of about 60 mesh) whose top section was 20 inches long and 1½ inches in diameter, whose middle section was 20 inches long and ¾ inch in diameter, and whose bottom section was 30 inches long and $15/32$ inch in diameter. It was eluted with 750 milliliters of hexene and followed by eluants carbon tetrachloride, chloroform, 5 percent methanol in chloroform and methanol of gradually increasing polarity. One hundred and twenty 15-milliliter cuts were taken. The unreacted cetane came through with the first 20 cuts and amounted to 72 percent by weight of the charge. 22 grams of cetanol and 2 grams of hexadecanone, which were present in cuts 50 to 100, were recovered.

0.2008 gram of the cetanol obtained, having a melting point of 43.9° to 44.2° C., was heated at 59.0±0.1° C. in 10 cc. of 50 percent nitric acid and one milligram of vanadium pentoxide for four hours, at which time the mixture was made basic with excess 10 N potassium hydroxide, extracted twice with 50 cc. of ether, isolated by evaporation of ether, acidified with sulfuric acid, and again extracted with ether. The ether contained 0.1692 gram of a colorless solid which analyzed as tetradecanoic acid.

While the cetanol employed above in the nitric acid oxidation was obtained by chromatographic separation, cetanol was also obtained by distillation. Thus 117.3 grams of the same material which was subjected to chromatographic separation above was distilled at 0.8 mm. of mercury. Unreacted cetane was obtained at temperatures up to 120° C., and 18 grams of cetanone and cetanol were obtained from 133° to 135° C.

Obviously, many modifications and variations of the invention, as hereinabove set forth, can be made without departing from the spirit and scope thereof, and therefore only such limitations should be imposed as are indicated in the appended claims.

I claim:

1. A process for producing monocarboxylic acids which comprises oxidizing a substantially pure saturated hydrocarbon with a gas containing molecular oxygen in the presence of boric acid for a time sufficient to convert about 10 to about 40 percent by weight of said hydrocarbon to an oxygenated product comprising monohydroxy secondary alcohols, ketones, acids and esters, separating said alcohols and ketones from said product and thereafter oxidizing said alcohols and ketones with nitric acid to obtain a product comprising the corresponding monocarboxylic acids.

2. A process for producing monocarboxylic acids which comprises oxidizing a substantially pure saturated hydrocarbon with a gas containing molecular oxygen in the presence of boric acid for a time sufficient to convert about 10 to about 40 percent by weight of said hydrocarbon to an oxygenated product comprising monohydroxy secondary alcohols, ketones, acids and esters, saponifying said latter product with a base to convert said esters to the corresponding acid salts and alcohols, recovering alcohols and ketones from the saponification mixture, and thereafter oxidizing said latter alcohols and ketones with nitric acid to obtain a product comprising the corresponding monocarboxylic acids.

3. A process for producing monocarboxylic acids which comprises oxidizing a substantially pure saturated hydrocarbon with a gas containing molecular oxygen in the presence of boric acid for a time sufficient to convert about 10 to about 40 percent by weight of said hydrocarbon to an oxygenated product comprising monohydroxy secondary alcohols, ketones, acids, esters and unreacted hydrocarbon, saponifying said product with a base to convert said esters to the corresponding acid salts and alcohols, removing said acids and acid salts from the saponification mixture by extraction with an aqueous solution, removing unreacted hydrocarbon from the resulting mixture to obtain a new mixture comprising alcohols and ketones, and thereafter oxidizing said latter mixture with nitric acid to obtain a product comprising the corresponding monocarboxylic acids.

4. A process for producing monocarboxylic acids which comprises oxidizing a substantially pure saturated hydrocarbon with a gas containing molecular oxygen in the presence of boric acid for a time sufficient to convert about 10 to about 40 percent by weight of said hydrocarbon to an oxygenated product comprising monohydroxy secondary alcohols, ketones, acids, esters and unreacted hydrocarbon, extracting said product with a base to remove said acids therefrom, saponifying the resulting product with a base to convert said esters to the corresponding acid salts and alcohols, removing the acid salts from the saponification mixture by extraction with an aqueous solution, removing unreacted hydrocarbon from the resulting mixture to obtain a new mixture comprising alcohols and ketones, and thereafter oxidizing said latter mixture with nitric acid to obtain a product comprising the corresponding monocarboxylic acids.

5. A process for producing monocarboxylic acids which comprises oxidizing a substantially pure saturated hydrocarbon with a gas containing molecular oxygen in the presence of boric acid for a time sufficient to convert about 10 to about 40 percent by weight of said hydrocarbon to an oxygenated product comprising monohydroxy secondary alcohols, ketones, acids, esters and unreacted hydrocarbon, extracting said product with a base to remove said acids therefrom, treating the extract obtained with a water immiscible organic liquid to obtain a neutral product, combining said neutral product with the remainder of said oxygenated product, saponifying said combined product with a base to convert said esters to the corresponding acid salts and alcohols, removing the acid salts from the saponification mixture by extraction with an aqueous solution, removing unreacted hydrocarbon from the resulting mixture to obtain a new mixture comprising alcohols and ketones, and thereafter oxidizing said latter mixture with nitric acid to obtain a product comprising the corresponding monocarboxylic acids.

6. A process for producing monocarboxylic acids which comprises oxidizing a substantially pure saturated hydrocarbon, having 6 to 40 carbon atoms in the molecule with a gas containing molecular oxygen in the presence of boric acid for a time sufficient to convert about 10 to about 40 percent by weight of said hydrocarbon to an oxygenated product comprising monohydroxyy secondary alcohols, ketones, acids, esters and unreacted hydrocarbon, extracting said product with sodium hydroxide to remove said acids therefrom, treating the extract obtained with petroleum ether to obtain a neutral product, combining said neutral product with the remainder of said oxygenated product, saponifying said combined product with potassium hydroxide to convert said esters to the corresponding acid salts and alcohols, removing said acid salts from the saponification mixture by extraction with an aqueous solution, removing unreacted hydrocarbon from the resulting mixture to obtain a new mixture comprising alcohols and ketones, and thereafter oxidizing said latter mixture with nitric acid to obtain a product comprising the corresponding monocarboxylic acids.

7. A process for producing monocarboxylic acids which comprises oxidizing a substantially pure saturated hydrocarbon having 6 to 40 carbon atoms in the molecule with a gas containing molecular oxygen in the presence of boric acid for about 3 to about 10 hours to obtain an oxygenated product comprising monohydroxy secondary alcohols, ketones, acids, esters and unreacted hydrocarbons, extracting said product with about one to about 20 percent by weight of sodium hydroxide to remove said acids therefrom, treating the extract obtained with about 20 to about 400 percent by weight of petroleum ether to obtain a neutral product, combining said neutral product with the remainder of said oxygenated product, saponifying said combined product with about one to about 20 percent by weight of potassium hydroxide to convert said esters to the corresponding acid salts and alcohols, removing said acid salts from the saponification mixture by extraction with an aqueous solution, removing unreacted hydrocarbon from the resulting mixture to obtain a new mixture comprising alcohols and ketones, and thereafter oxidizing said latter mixture with nitric acid to obtain a product comprising the corresponding monocarboxylic acids.

References Cited in the file of this patent

UNITED STATES PATENTS

| | | |
|---|---|---|
| 1,721,959 | James | July 23, 1929 |
| 1,931,859 | Beller et al. | Oct. 24, 1933 |
| 2,267,377 | Olin | Dec. 23, 1941 |
| 2,434,888 | Rust et al. | Jan. 20, 1948 |
| 2,452,326 | Rust et al. | Oct. 26, 1948 |
| 2,537,577 | Fasce | Jan. 9, 1951 |
| 2,610,197 | Cunningham | Sept. 9, 1952 |
| 2,675,407 | Gallo | Apr. 13, 1954 |
| 2,766,267 | Hill | Oct. 9, 1956 |

OTHER REFERENCES

Fatty Acids, by Markley, Interscience Publishers Inc., New York, 1947, pp. 542–544.